US012692091B2

(12) United States Patent (10) Patent No.: US 12,692,091 B2

Reinhardt et al. (45) Date of Patent: Jul. 28, 2026

(54) DEVICE AND METHOD FOR PREVENTING FAULTS OF AN OVEN FOR PRODUCING CONTAINERS, IN PARTICULAR CANS

(71) Applicant: BELVAC PRODUCTION MACHINERY, INC., Lynchburg, VA (US)

(72) Inventors: Ulf Reinhardt, Teutschenthal (DE); Wilko Harms, Wittmund (DE)

(73) Assignee: Belvac Production Machinery, Inc., Lynchburg, VA (US)

( * ) Notice: Subject to any disclaimer, the term of this patent is extended or adjusted under 35 U.S.C. 154(b) by 37 days.

(21) Appl. No.: 18/684,288

(22) PCT Filed: Aug. 5, 2022

(86) PCT No.: PCT/DE2022/100570
§ 371 (c)(1),
(2) Date: Feb. 16, 2024

(87) PCT Pub. No.: WO2023/020654
PCT Pub. Date: Feb. 23, 2023

(65) Prior Publication Data

US 2024/0246771 A1 Jul. 25, 2024

(30) Foreign Application Priority Data

Aug. 20, 2021 (DE) .................... 10 2021 121 652.4

(51) Int. Cl.
*B65G 43/08* (2006.01)
*F26B 15/00* (2006.01)
(52) U.S. Cl.
CPC .............. *B65G 43/08* (2013.01); *F26B 15/00* (2013.01); *B65G 2201/0252* (2013.01); *B65G 2203/0241* (2013.01); *B65G 2811/095* (2013.01)

(58) Field of Classification Search
CPC ............ B65G 43/08; B65G 2204/0252; B65G 2203/0241; B65G 2811/095; F26B 15/00
(Continued)

(56) References Cited

U.S. PATENT DOCUMENTS 6,523,277 B1 * 2/2003 Claggett ................. F26B 15/24
34/104
6,930,296 B2 * 8/2005 Chen ........................ A21B 7/00
219/700
(Continued)

FOREIGN PATENT DOCUMENTS

AU 2017228705 A1 4/2018
CN 110418930 A 11/2019
(Continued)

OTHER PUBLICATIONS

NZ 711551 A (Year: 2016).*
International Search Report in International Patent Application No. PCT/DE2022/100570 dated Nov. 25, 2022 (6 pgs.).

*Primary Examiner* — Gene O Crawford
*Assistant Examiner* — Lester Rushin, III
(74) *Attorney, Agent, or Firm* — Nixon Peabody LLP

(57) ABSTRACT

The invention relates to a device and a method for preventing faults of an oven for producing containers, in particular cans. The device comprises: a conveyor unit with transport pins, said conveyor unit being designed to convey the containers along a drying section; at least one measuring unit which is designed to: ascertain an inlet number of containers which have entered an observation section of the drying section and an outlet number of containers which have exited the observation section; and a control device which is designed to: determine the amount of container loss on the basis of a deviation between the inlet number and the outlet number.

15 Claims, 3 Drawing Sheets

(58) Field of Classification Search
    USPC ...................................................... 198/502.1
    See application file for complete search history.

(56)                    References Cited

U.S. PATENT DOCUMENTS

| 2011/0260372 A1 | 10/2011 | Hahn | |
|---|---|---|---|
| 2016/0075520 A1* | 3/2016 | Halbritter | .............. B65G 43/08 |
| | | | 198/358 |
| 2021/0269187 A1* | 9/2021 | Poeschl | ................... B65B 57/10 |

FOREIGN PATENT DOCUMENTS

| CN | 211870645 U | 11/2020 | |
|---|---|---|---|
| DE | 102018210670 A1 | 1/2020 | |
| EP | 3296031 A1 | 3/2018 | |
| JP | 2011152971 A | 8/2011 | |
| NZ | 711551 A * | 11/2016 | .............. F26B 15/14 |
| WO | 2012054655 A1 | 4/2012 | |

* cited by examiner

200

210

220

230

DEVICE AND METHOD FOR PREVENTING FAULTS OF AN OVEN FOR PRODUCING CONTAINERS, IN PARTICULAR CANS

CROSS-REFERENCE TO RELATED APPLICATIONS

This application is a U.S. national stage of International Application No. PCT/DE2022/100570, filed Aug. 5, 2022, which claims the benefit of and priority to German Patent Application No. 10 2021 121 652.4, filed Aug. 20, 2021, each of which is hereby incorporated by reference herein in its entirety.

FIELD

The invention relates to a device and a method for preventing faults of an oven for producing containers, in particular cans.

BACKGROUND

In the production process of (metal) objects, in particular cans or parts of cans using an oven, several process steps must be carried out, which are separated in detail by cleaning processes. These cleaning processes require a drying process.

One of these process steps is the application of a coating to the outer surface of a can, which is designed as a coating of lacquer or paint. Such a coating can, for example, display the brand name of the provider, instructions for use, or other content. A device for applying such a coating to cans is also known as a printing device. To ensure that this coating remains durable, it usually has to be cured after application by means of one or more drying processes. For this curing of the coating, for example, pin ovens are used in which the coating is convectively heated, dried, cured, and/or baked. The pin oven has a chain, usually a metal chain, to convey the cans. The drying process usually takes place along a drying section of the pin oven. The metal chain has transport pins that pick up the cans through an opening in the chain and convey the cans through the pin oven. Depending on their orientation, the cans rest on the transport pins or the metal chain due to their own weight. Fans are also used to hold the cans on the transport pins. The fans are also used to supply and extract air to and from the pin oven.

The cans can fall off the metal chain or transport pins along the drying section. These dropped cans cannot complete the drying process and cannot be used. The cans can also be damaged if they fall.

Particularly with relatively short cans, so-called Stabi-Cans, with a capacity of 0.3 L or less, for example, it is difficult to stabilize them on the metal chain or the transport pins, so that with this type of can there is an increased number of cans falling down compared to relatively long cans, such as 0.5 L cans.

Another problem with falling cans is that they can collect at different sections of the drying section. Due to the increased quantity of cans in such a section, composed of the dropped cans and the cans on the metal chain in the section, the heat energy to be supplied for drying the cans can be increased, for example. There may also be an increased amount of paint in the cans in this section, which may mean a higher volume of exhaust air.

In addition to the increased energy costs and the reduced number of cans dried and conveyed by the metal chain, dropped cans can pose a safety risk. In particular, the dropped cans can pile up and eventually interfere with the metal chain, for example. Furthermore, the fallen cans can cover exhaust and/or supply air ducts and/or heating elements. This means that dropped cans can have a negative impact on production. In particular, dropped cans can cause damage to the metal chain and other units of the pin oven.

During production, it is not possible for staff to enter the pin oven and remove the cans that have fallen down. As a result, production has to be stopped to remove the cans that have fallen. It is often not clear to staff how many cans have already fallen and where they have fallen, so the drying section should be inspected at regular intervals. This means a standstill in production, which must be prevented.

It is therefore the object of the present invention to provide a device and a method for preventing faults of an oven, in particular a pin oven for producing containers, in particular cans, which eliminates one or more of the aforementioned disadvantages. In particular, it is the task of the invention to determine a location of the dropped containers and to control the oven in such a way that the number of dropped cans is minimized. Furthermore, it is the task of the invention to ascertain a relationship between various control variables of a conveyor unit of the oven, units of the oven, and/or the oven in order to achieve the lowest possible amount of container loss by adjusting one or more control variables.

SUMMARY

According to one embodiment, a device for preventing faults of an oven for the production of containers is disclosed. The device comprises a conveyor unit with transport pins. The conveyor unit is designed for conveying the containers along a drying section. The device further comprises at least one measuring unit configured to ascertain an inlet number of containers entering an observation section of the drying section and an outlet number of containers exiting the observation section. The device further includes a control device configured to determine an amount of container loss on the basis of a deviation between the inlet number and the outlet number.

According to another embodiment, a computer-implemented method for preventing faults of an oven for producing containers, in particular cans is disclosed. The method includes conveying of the containers by means of a conveyor unit along a drying section. The method further includes ascertaining an inlet number of containers entering an observation section of the drying section and an outlet number of containers exiting the observation section. The method further includes determining an amount of container loss on the basis of a deviation between the inlet number and the outlet number.

BRIEF DESCRIPTION OF THE DRAWINGS

Preferred exemplary embodiments are explained by way of example with reference to the enclosed figures. It shows.

In the figures, identical or essentially functionally identical or similar elements are designated with the same reference symbols.

DETAILED DESCRIPTION

Figure 1:
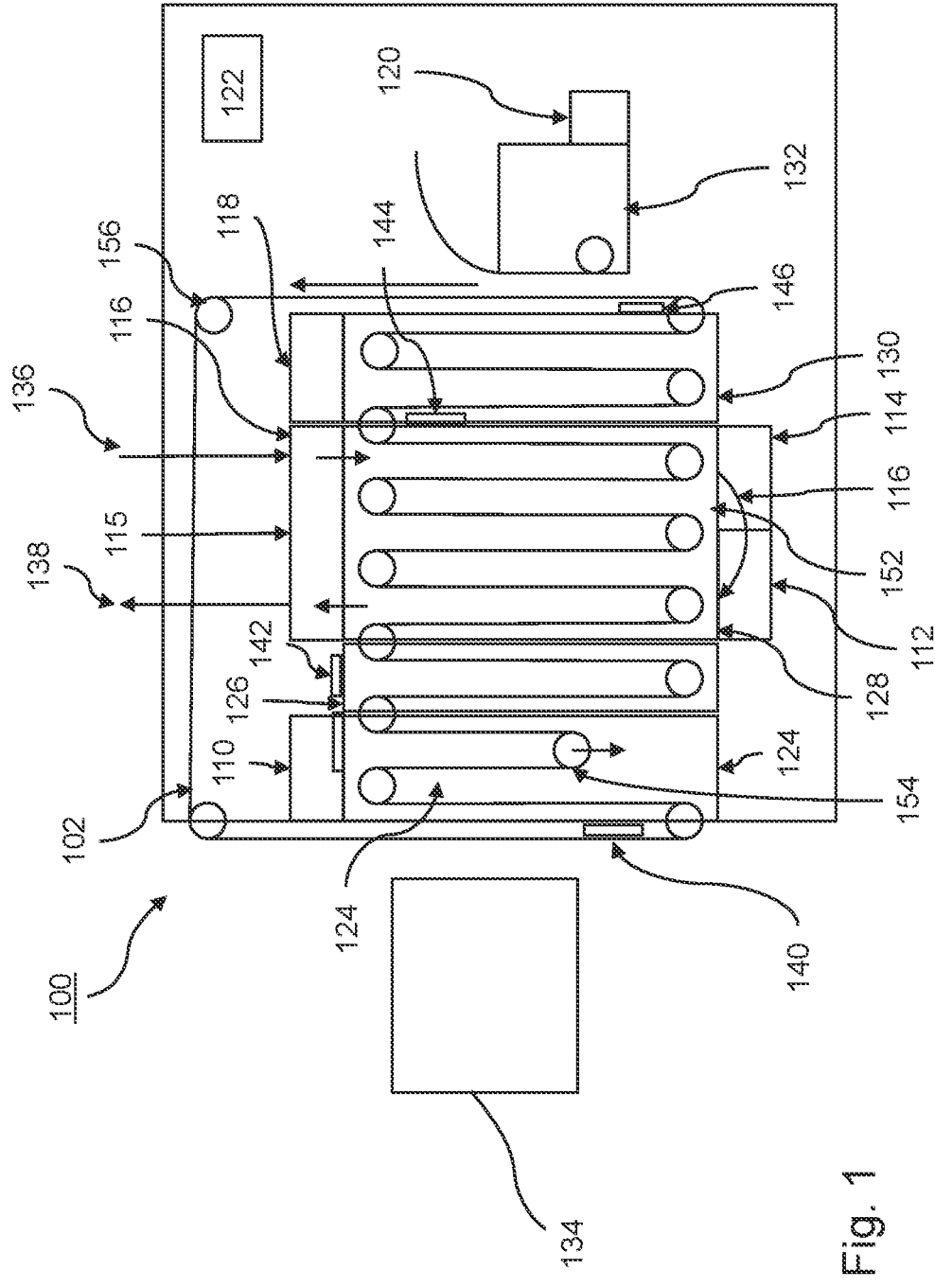
FIG. 1 a schematic, two-dimensional side view of a pin oven.

This problem is solved by a device for preventing faults of an oven for producing containers, in particular cans, comprising a conveyor unit with transport pins, the conveyor unit being designed for conveying the containers along a drying section. The device further comprises at least one measuring unit which is designed to ascertain an inlet number of containers which enter an observation section of the drying section and an outlet number of containers which exit the observation section. The device further comprises a control device which is designed to determine an amount of container loss on the basis of a deviation between the inlet number and the outlet number.

The proposed device can be used to determine the amount of container loss in the observation section, i.e., the number of containers lost in this observation section. In particular, it can be used to determine how many containers have been lost, especially dropped, in this observation section. This provides the staff with a control variable, in this case the amount of container loss, which they can use to determine, among other things, a time at which production can be stopped and the dropped containers removed.

The oven can be a pin oven. A fault can be the blocking of the conveyor unit by containers that have fallen off the conveyor unit or containers that are no longer on the transport pins.

The drying section can be a drying section of the oven. In particular, the drying section can be a section along which the containers are conveyed through sections of the oven by means of the conveyor unit. The observation section can comprise at least one such section of the oven or drying section. Such sections of the oven or drying section can comprise a container feed section on the conveyor unit, a decorator section of a decorating unit, a pre-drying frame, a cooling zone, and/or a conveyor unit return. The observation section can comprise at least the drying section. The observation section can comprise two or more of the sections. The observation sections can be arranged in direct succession along the drying section, i.e., without a further section between the observation sections. Alternatively or additionally, the observation sections can have at least one further section between them.

The measuring unit can also be designed to ascertain at least one actual control variable for controlling the conveyor unit and/or the oven, in particular for controlling the observation section.

The conveyor unit can be a chain conveyor that has the transport pins arranged at a distance from each other along its main direction of extension. The containers can be positioned using the transport pins. For this purpose, the transport pins can protrude into the containers, which are open at one end. The conveyor unit can be designed to convey the containers through the oven along a conveying direction.

The control device may further be designed to output an adjustment command for adjusting at least one target control variable for controlling the conveyor unit, the oven, and/or at least one unit of the oven on the basis of at least one of the inlet number, the outlet number, the amount of container loss and the at least one actual control variable.

The actual control variable is a current or currently used control variable of the conveyor unit, the oven and/or at least one unit of the oven. For example, the conveyor unit is operated at a current conveying speed of 5 m/s. The target control variable is a control variable to be adjusted. For example, the conveying speed should be reduced to 3 m/s using the target control variable. Accordingly, on the basis of the knowledge of the inlet number, the outlet number, the amount of container loss and the actual control variable, it is possible to change one or more target control variables and thus reduce the amount of container loss.

The actual control variable and/or the target control variable for controlling the conveyor unit can characterize a conveying speed of the conveyor unit, a transport density along the drying section, in particular along the observation section, and/or a torque of a drive unit driving the conveyor unit, wherein the transport density characterizes a conveyed number of containers per unit of time. Alternatively or additionally, the actual control variable and/or the setpoint control variable for controlling the oven, in particular for controlling at least one unit of the oven, can be a fluid flow control variable for controlling at least one fluid flow device for applying a fluid flow to the containers along the drying section, in particular along the observation section, a heating device of the oven, in particular of the observation section, characterize a temperature of the fluid of the fluid flow, a temperature, in particular a target temperature of the containers, a heating temperature of the observation section, and/or a heating temperature profile of the oven, in particular at least along the observation section.

The actual control variable and the setpoint control variable can be of the same type in relation to the unit to be controlled, such as the conveyor unit, the oven and/or at least one unit of the oven, such as the fluid flow device, or the parameter to be controlled, such as the temperature. For example, the actual control variable and the target control variable may relate to the conveying speed but have different values. The actual control variable of the conveying speed can be 5 m/s, while the target control variable is 3 m/s. Furthermore, the actual control variable and the target control variable can be of different types in relation to the unit to be controlled, such as the conveyor unit, the oven, and/or a unit of the oven, such as the fluid flow device, or the parameter to be controlled, such as the temperature. For example, the actual control variable can relate to the conveying speed, while the setpoint control variable relates to the temperature of the fluid. For example, the actual control variable can relate to the conveying speed, wherein the adjustment command adjusts a target control variable of the fluid flow device by increasing a speed of the fluid flow device and thus a fluid flow rate and/or a contact pressure by the acting fluid. The amount of container loss can be reduced accordingly, as the containers are pressed against the conveyor unit with greater contact pressure and are therefore less likely to fall down.

The at least one measuring unit can further be designed to ascertain at least one container property, the container property being one of a container type, a container body and a container geometry of the containers. The adjustment command can still be based on the container property. Alternatively, the container properties can be stored in a memory that can be accessed by the control device, or can be specified or entered by another unit, such as a printing device of the control device or a user of the device.

The at least one measuring unit can be designed to detect vibrations of the conveyor unit. The adjustment command can still be based on the detected vibrations. In particular, the control device can be designed to determine a relationship between the actual control variable and/or the target control variable, in particular with regard to the conveying speed and the oscillation. The output command can still be based on this context.

The control device can be designed to determine the output command in such a way that the detected vibrations are reduced and/or compensated.

During operation, as well as when starting, increasing and/or reducing a conveying speed of the conveyor unit, it can be set into vibration. These vibrations can run in or against the conveying direction and pose a risk to the containers, as they can fall off the conveyor unit due to the vibrations and/or individual process steps can be negatively affected. The oscillations can have an oscillation amplitude and/or frequency and can be described by means of these.

Ascertaining the at least one measuring unit, as described above and below, can comprise recording the respective actual control variable, the inlet number and the outlet number and other disclosed variables to be ascertained. Alternatively or additionally, the ascertaining may comprise receiving corresponding information concerning the control variables, the inlet number and the outlet number and the variables to be ascertained, and the measuring unit may determine the control variables, the inlet number and the outlet number and the variables to be ascertained on the basis of the information. The measuring unit can receive the information from another unit or a network.

The at least one measuring unit can comprise or be at least one of a light barrier, a camera, a proximity switch, a metal detector and a sensor.

The at least one measuring unit can be designed to ascertain a time of the inlet number, the outlet number, the actual control variable and the target control variable. The adjustment command can also be based on the time of the inlet number, the outlet number and/or the actual control variable.

The at least one measuring unit, the control device, the conveyor unit and/or the oven, in particular at least one individual unit of the oven, can be coupled to one another using signal technology.

The control device can also be designed to determine the adjustment command in such a way that the amount of container loss is minimized. Alternatively or additionally, the target control variable and/or the actual control variable can be a control variable that has an influence on the amount of container loss of the at least one observation section.

The adjustment command can further be based on a first priority level, wherein the first priority level comprises predetermined, in particular legally prescribed upper and/or lower limits of the actual control variable and/or the target control variable and the adjustment command adjusts the target control variable in such a way that the target control variable reaches at most the upper and/or lower limit.

The adjustment command may be based on a second priority level subordinate to the first priority level, wherein the second priority level characterizes at least one of: a minimized energy consumption of the conveyor unit, the observation section, the at least one heating device, the at least one fluid flow device and/or the oven necessary to produce the containers, and a minimization of the amount of container loss.

The control device may further be designed to determine the adjustment command on the basis of a contact pressure of the containers for stabilizing the containers on the conveyor unit, the contact pressure being based on at least one of the container property, the conveying speed, the container density and the fluid flow applied to the containers, in particular along the observation section. In particular, the contact pressure can be a minimum contact pressure that stabilizes the containers on the conveyor unit. The minimum contact pressure is the minimum contact pressure that must be applied so that the containers rest on the conveyor unit and/or are stabilized. As the containers are not necessarily conveyed along the drying section only along a horizontal conveying direction, but also vertically and/or in other directions, it is often the case that the weight of the containers is not sufficient to hold them on the transport pins. Depending on the direction of conveying, a corresponding contact pressure, in particular a corresponding minimum contact pressure, may be required.

The control device can also be designed to output control information. The control information can characterize at least one of the inlet number, the outlet number, the amount of container loss, the at least one actual control variable, the at least one target control variable, the adjustment command, the observation section, the container property, the first priority level, the second priority level, and the contact pressure. The control information can be output to another control device, a computer and/or a network for further analysis and/or data processing.

The device can further comprise a display unit which is designed to display the control information. Consequently, the control information can be provided to a user. The display unit can be a screen, a computer, a laptop, a smartphone or the like, or be part of it.

The display unit can also be designed to receive an input. Alternatively or additionally, the device can comprise an input unit that is designed to receive an input. The input can be an input from a user, an input from another unit, such as a computer, laptop, smartphone or similar, and/or an input received from a network.

The input may comprise at least one of the at least one actual control variable, the at least one target control variable, the adjustment command, the observation section, the container property, the first priority level, the second priority level and the contact pressure. The control device can be designed to receive the input from the display unit and/or the input unit and, on the basis of the input, to determine the at least one actual control variable, the at least one desired control variable, the observation section, the container property, the first priority level, the second priority level, and/or the contact pressure, and/or to output the adjustment command on the basis of the input. Consequently, a user can enter one or more of the aforementioned variables and also overwrite them so that the control device works with the variables entered by the user.

The control device can further be designed to determine a change in the conveyor unit and/or a conveyor system comprising the conveyor unit and/or the fluid flow device on the basis of the amount of container loss and/or the at least one actual control variable. The fluid flow device can have one, two, or more outlet nozzles. The conveyor system can comprise the drive unit for driving the conveyor unit, one or more guide rails for guiding the conveyor unit and/or one or more support elements for supporting the conveyor unit. The conveyor system can have further units that are provided for conveying the containers by means of the conveyor unit.

The control device can also be designed to output change information. The display unit can be designed to display the change information. Such a change can be that one or more conveyor unit wheels, in particular chain wheels, are no longer correctly aligned, which can lead to reduced stability and thus to a loss of containers or an amount of container loss. The distance between the outlet nozzles is predetermined, for example approx. 25 mm, as is the distance between the fluid supply channels in the pre-drying frame, the oven and the cooling zone, and may have changed. This may be due to thermal stress. Changing the outlet nozzles can also have a negative impact on container production and lead to an increased amount of container loss.

The drying section can have two or more observation sections. The device can have a predetermined number of measurement units based on the number of observation sections. With respect to at least one of the two or more observation sections, the at least one measuring unit can be designed to ascertain an inlet number of containers that enter the at least one observation section and an outlet number of containers that exit the at least one observation section.

The control device can be designed in relation to the at least one and/or another of the two or more observation sections for determining an amount of container loss of the at least one observation section on the basis of a deviation between the inlet number and the outlet number of the at least one observation section.

In relation to the at least one observation section of the two or more observation sections, the at least one measuring unit can be designed to ascertain at least one actual control variable for controlling the conveyor unit and/or the oven, in particular for controlling the at least one observation section.

The control device may further be designed to output at least one adjustment command for adjusting at least one target control variable for controlling the conveyor unit, the oven and/or at least one unit of the oven, in particular the at least one of the two or more observation sections, on the basis of at least one of at least one of the determined amount of container loss and the at least one actual control variable of the at least one of the two or more observation sections.

The actual control variable and/or the target control variable can be a control variable that has an influence on the amount of container loss of at least one of the two or more observation sections.

The adjustment command can adjust one, two or more target control variables of at least one observation section and/or further observation sections.

Adjusting at least one target control variable for controlling the conveyor unit means that a control variable that influences and/or controls the conveyor unit is adjusted. Control variables of the conveyor unit that can be adjusted can be the conveying speed, acceleration, deceleration, transport density, and/or the torque of the drive unit. Furthermore, adjusting a target control variable of the oven means adjusting a control variable that influences and/or controls the oven. Control variables of the oven can be the fluid flow control variable, a control variable of the heating device, in particular a heating power, the temperature of the fluid, the temperature, in particular the target temperature of the containers, the heating temperature, in particular of the observation section, in particular of the observation section, and/or the heating temperature curve.

The task is further solved by a computer-implemented method for preventing faults of an oven for the production of containers, in particular cans. The method comprising the steps: conveying the containers along a drying section by means of a conveyor unit; ascertaining an inlet number of containers entering an observation section of the drying section and an outlet number of containers exiting the observation section; determining an amount of container loss on the basis of a deviation between the inlet number and the outlet number.

Further, the problem is solved by a computer program product for preventing faults of an oven for producing containers, in particular cans, comprising instructions which cause a processor to execute a method according to the aspect described above when the program is executed by the processor.

Embodiments and features made in relation to the device may also be formed as computer-implemented method steps.

The computer-implemented method is particularly suitable to be used for the aforementioned device and/or an oven, in particular a pin oven.

For further advantages, embodiment variants and embodiment details of the further aspects and their possible embodiments, reference is also made to the previous description of the corresponding features and embodiments of the device.

FIG. 1 shows a pin oven 100. The pin oven 100 comprises a conveyor unit 102, which is designed as a chain conveyor or chain. The conveyor unit 102 comprises the transport pins 104, 104', 104" shown in FIG. 2. Containers 1, 1' can be arranged on the transport pins 104, 104', 104" and thus conveyed along the meandering drying section shown in FIG. 1. The pin oven 100 further comprises a plurality of fluid flow devices, here a circulating air fluid unit 112, a fluid flow unit 115, and a cooling fluid unit 118 and a container removal unit 120.

The containers 1, 1' are printed or coated, in particular with a lacquer, in a printing device 134 not included in the pin oven 100. The containers 1, 1' are transferred from the printing device 134 to the pin oven 100. The printing device 134 and the pin oven 100 may be coupled together such that the printing device 134 drives the conveyor unit 102. The containers 1, 1' then enter a pre-drying frame 124. The chain tension control 154 is provided within the pre-drying frame 124, which tensions the chain of the conveyor unit 102 so that it always has a predefined tension. Downstream of the pre-drying frame 124, the pin oven 100 has a bottom coater 126. Downstream of the bottom coater 126, the pin oven 100 has an oven unit 128.

The oven unit 128 forms an oven chamber 152 in which the containers 1, 1' are heated to a high temperature. For this purpose, the oven unit 128 has a heating device, in this case a heating unit 114. The heating unit 114 can be a gas burner, for example. The heating unit 114 is coupled to a fluid flow device, in this case the circulating air fluid unit 112, which moves the fluid flow in a fluid flow direction 116, i.e., first from the oven chamber 152 into the heating unit 114, then into the circulating air fluid unit 112 and then back into the oven chamber 152. In this way, a heated fluid flow is made available to the oven chamber 152. The oven unit 128 is furthermore coupled to a further fluid flow device, in this case a fluid flow unit 115. The fluid flow unit 115 is arranged and configured to provide a fluid from the environment of the pin oven 100 to the oven unit 128 and to supply a fluid out of the oven unit 128. For this purpose, the pin oven has a fluid inlet device 136 and a fluid outlet device 138.

A cooling zone 130 is provided further downstream of the oven unit 128. The cooling zone 130 is optional for the pin oven 100 and is generally not absolutely necessary. In the cooling zone 130, a further fluid flow device, in this case the cooling fluid unit 118, is arranged and designed to cool the containers 1, 1' with a fluid flow. A container extractor 132 is located at the outlet of the cooling fluid unit 118. The container extractor 132 has a container removal unit 120 which exerts a negative pressure on the bottoms of the containers 1, 1' by means of a fluid flow and thus removes them from the conveyor unit 102 and can move them to a downstream process step.

As described above, the conveyor unit 102 conveys the containers 1, 1' along the drying section, which runs through the pre-drying frame 124, the oven unit 128 and the cooling zone 130. After the conveyor unit 102 has transferred the containers 1, 1' to the container extractor 132, the conveyor unit 102 is returned to the printing device 134 by means of rollers 156.

A device for preventing faults of the pin oven 100 according to FIG. 1 comprises a control device 122, first to fourth measuring units 140, 142, 144, 146, and the conveyor unit 102.

The first measuring unit 140 is located after the printing device 134 and before the pre-drying frame 124 along the drying section, the second measuring unit 142 is located after the pre-drying frame 124 and before the oven chamber 152, the third measuring unit 144 is located after the oven chamber 152 and before the cooling zone 130, and the fourth measuring unit is located after the cooling zone 130 and before the container extractor 132.

According to FIG. 1, the first measuring unit 140 is designed to ascertain a first inlet number of containers 1, 1' that enter the pre-drying frame 124 as the first observation section. The second measuring unit 142 is designed to ascertain a first outlet number of containers 1, 1' exiting the pre-drying frame 124 and a second inlet number of containers 1, 1' entering the oven chamber 152 as the second observation section. The third measuring unit 144 is designed to ascertain a second outlet number of containers 1, 1' exiting the oven chamber 152 and a third inlet number of containers 1, 1' entering the cooling zone 130 as the third observation section. Finally, the fourth measuring unit 146 is designed to ascertain a third outlet number of containers 1, 1' exiting the cooling zone 130. Alternatively, the device can comprise fewer or more measuring units to determine the inlet numbers and the outlet numbers. For example, a single measuring unit may be designed to determine the inlet number and the outlet number of the pre-drying frame 124, another measuring unit may determine the inlet number and the outlet number of the oven chamber 142, and another measuring unit may determine the inlet number and the outlet number of the cooling zone 130. Alternatively, a single measuring unit can determine all inlet and outlet numbers. The number of measuring units is not limited to the number of observation sections.

On the basis of the first to third inlet numbers and the first to third outlet numbers, the control device 122 can determine first to third amounts of container loss. The amount of container loss results from a deviation between the respective inlet number and outlet number of an observation section, wherein the observation sections here are the pre-drying frame 124, the oven chamber 152 and the cooling zone 130.

The control device 122 is further designed to output an adjustment command for adjusting at least one target control variable for controlling the conveyor unit 102 and/or the pin oven 100 on the basis of the amount of container loss. A target control variable is, for example, the conveying speed of the conveyor unit 102. To reduce the amount of container loss, the conveying speed can be reduced as the target control variable using the adjustment command. The adjustment command is therefore output or forwarded to a drive of the conveyor unit 102. Due to the lower conveying speed, the containers 1, 1' are exposed to lower centrifugal forces and/or vibrations and it is less likely that they will fall off the conveyor unit 102.

The control device 122 may additionally or alternatively adjust at least one further target control variable using the adjustment command on the basis of the one or more amounts of container loss. A further decisive variable for reducing the amount of container loss is a contact pressure which is exerted on the containers 1, 1' by means of a fluid flow of one or more fluid flow devices, so that these are pressed against the conveyor unit 102. In particular, there may be a correlation between various target control variables, such as the conveying speed and the contact pressure.

According to FIG. 1, the first to fourth measuring units 140, 142, 144, 146 are designed to ascertain at least one actual control variable for controlling the conveyor unit and/or the oven, in particular for controlling the observation section. In particular, the first and second measuring units 140, 142 are designed to ascertain at least one actual control variable of the pre-drying frame 124, the second to third measuring units 142, 144 are designed to ascertain at least one actual control variable of the oven chamber 152, and the third to fourth measuring units 144, 146 are designed to ascertain at least one actual control variable of the cooling zone 130.

An actual control variable is a currently used or current control variable for controlling the conveyor unit 102, a unit of the pin oven 100, and/or the pin oven 100. In contrast, the target control variable is a control variable that needs to be adjusted using the adjustment command. The actual control variable and the setpoint control variable may be of the same type, for example relating to the conveying speed, but may also be of different types, for example the actual control variable relates to the conveying speed and the setpoint control variable relates to the heating temperature in the oven chamber 152. In particular, the first to fourth measuring units 140, 142, 144, 146 can ascertain or record a point in time and/or a temporal progression of the at least one actual control variable.

The actual control variable and/or the target control variable for controlling the conveyor unit 102 can characterize a conveying speed of the conveyor unit 102 and/or a transport density along the drying section, in particular along the observation section, wherein the transport density characterizes a conveyed number of containers 1, 1' per time unit. The actual control variable and/or the setpoint control variable for controlling the pin oven 100 can be a fluid flow control variable for controlling at least one fluid flow device 110, 112, 115, 116, 118, 136, 138 for applying a fluid flow to the containers 1, 1' along the drying section, in particular along the observation section, of the heating device, in this case the heating unit 114 of the pin oven 100, in particular of the observation section, characterize a temperature of the fluid of the fluid flow, a temperature, in particular a target temperature of the containers 1, 1', a heating temperature of the observation section and/or a heating temperature profile at least along the observation section.

Another decisive factor for the amount of container loss are the container properties of the containers 1, 1'. At least one of the measuring units 140, 142, 144, 146 can further be designed to ascertain at least one container property of the containers 1, 1', wherein the container property is one of a container type, a container body and a container geometry of the containers 1, 1'. The adjustment command can still be based on the container property. For example, if the container is relatively large, such as a 0.5 L can, it has at least a larger surface area compared to a relatively small container, such as a 0.3 L can. This larger surface area provides a larger contact surface for the fluid flow. Other container properties, such as the weight, the base area and the extended length of the containers 1, 1' can play a significant role in the amount of container loss.

The control device 122 is further designed to output and/or provide control information. The control information can characterize at least one of the inlet numbers, the outlet numbers, the amount of container loss, the at least one actual control variable, the at least one target control variable, the adjustment command, the observation sections, a first and a second priority level and the contact pressure.

The measuring units 140, 142, 144, 146 are further designed to determine a point in time of the determined variables.

By means of a display unit not shown, the control information can be displayed and, in particular, made available to a user. Furthermore, the user can make an input using the display unit and/or an input unit not shown. The user can use the input to determine one or more of the sizes of the displayed control information. In particular, the user can specify which variables are to be determined by means of the measuring units 140, 142, 144, 146 and/or can specify these himself. Accordingly, the user can set different sizes which, in his opinion, can lead to a reduction in the amount of container loss, for example. This is possible because he is provided with information about the location, time and conditions of the observation section(s) and can therefore take appropriate measures on the basis of this knowledge.

In particular, the adjustment command may be based in part on the quantities determined by the measuring units 140, 142, 144, 146, and in part on the quantities specified by the user. Accordingly, the adjustment command can be determined automatically by the control device 122 or the user can manually influence the adjustment command and the other variables by means of his input.

The control device 122 may further be designed to determine the adjustment command such that the amount of container loss is minimized, wherein the target control variable and/or the actual control variable is a control variable that has an influence on the amount of container loss of the at least one observation section.

The first to fourth measuring units 140, 142, 144, 146 may comprise or be at least one light barrier. If the conveying speed is known, the extension length (height) and the diameter of the containers 1, 1' can be determined using the light barriers.

With further data processing and combination with the time, conveying speed, fan speeds of the fluid flow devices, temperatures and/or container properties, further optimizations can be carried out. A container loss or the amount of container loss in the pre-drying frame 124 may be reduced or limited by increasing or decreasing the target control variable of the fan speed of the stabilization unit 110. A container loss or the amount of container loss in the oven chamber 152 can be optimized by adjusting the target control variable of the fluid flow device 115. A container loss or the amount of container loss in the cooling zone 130 can be optimized by adjusting the target control variable of the fan speed of the cooling fluid unit 118.

The adjustment command can further be based on a first priority level, wherein the first priority level comprises predetermined, in particular legally prescribed upper and/or lower limits of the actual control variable and/or the target control variable and the adjustment command adjusts the target control variable in such a way that the target control variable reaches at most the upper and/or lower limit. During the drying process of the containers 1, 1', a lubricant for lubricating the conveyor unit 102 as well as paint materials for coating the containers 1, 1' can evaporate and must not exceed a predetermined upper limit, since an excessive concentration can lead to ignition, for example. Consequently, the fan speeds may only be operated within predetermined ranges.

The control device 122 may further be designed to determine the adjustment command on the basis of a second priority level that is subordinate to the first priority level.

Subordinate means that the first priority is only taken into account if it is fulfilled. The second priority level characterizes at least one of a minimized energy consumption of the conveyor unit 102, the observation section, the at least one heating device, here the heating unit 114, the at least one fluid flow device and/or the pin oven 100 necessary to produce the containers 1, 1', and a minimization of the amount of container loss. Accordingly, an energy requirement can be achieved with the lowest possible amount of container loss and compliance with the predetermined upper and/or lower limits.

Figure 2:
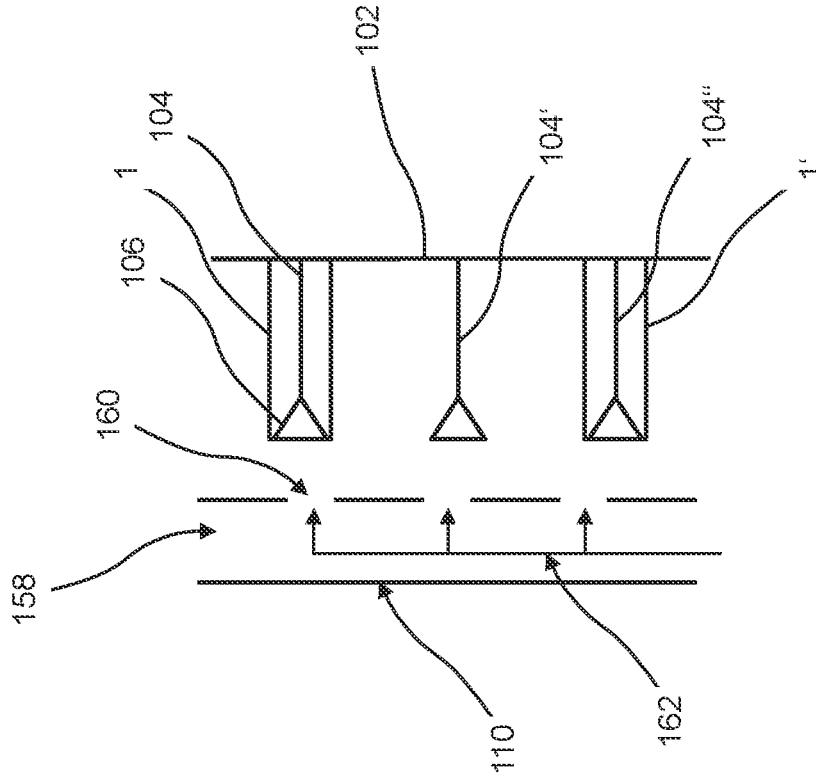
FIG. 2: a schematic, two-dimensional detail view of the pin oven shown in FIG. 1.

FIG. 2 shows a detail of the pin oven 100, namely the stabilizing unit 110. The stabilization unit 110 comprises an air duct 158. Openings 160 are provided on one side of the air duct 158. A fluid flow 162 guided in the air duct 158 exits through the opening 160 and from there exerts a fluid pressure or contact pressure on the containers 1, 1'. Due to this pressure, the containers 1, 1' are pressed onto the transport pins 104, 104', 104" or onto the holding element 106 of the transport pins 104, 104', 104". As a result, the containers 1, 1' are stabilized.

Figure 3:
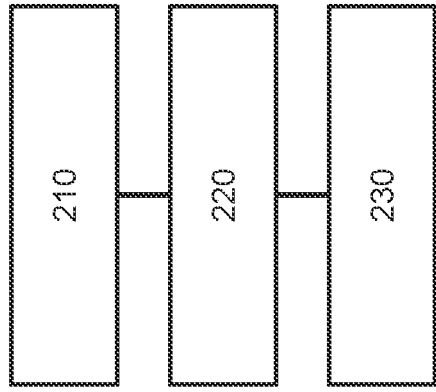
FIG. 3 a schematic view of an exemplary method.

FIG. 3 shows a computer-implemented method 200 for preventing faults of a pin oven 100 for producing containers 1, 1', in particular cans. The method 200 comprises conveying 210 the containers 1, 1' by means of a conveyor unit 102 along a drying section and ascertaining 220 an inlet number of containers 1, 1' entering an observation section of the drying section and an outlet number of containers 1, 1' exiting the observation section. The method 200 further comprises determining 230 an amount of container loss 1, 1' on the basis of a deviation between the inlet number and the outlet number.

The control device 122 of the device may comprise a processor by means of which a computer program product for preventing faults of a pin oven 100 for producing containers 1, 1', in particular cans, is executed, comprising instructions which cause the processor to execute the previously described method 200 when the program is executed by the processor.

REFERENCE SYMBOLS 1, 1' Container
100 Pin oven
112 Conveyor unit
104, 104', 104" Transport pin
106 Holding element
110 Stabilization unit
112 Circulating air fluid unit
114 Heating unit
115 Fluid flow device
116 Fluid flow direction
118 Cooling fluid unit
120 Container removal unit
122 Control device
124 Pre-drying frame
126 Floor coater
128 Oven unit
130 Cooling zone
132 Container puller
134 Printing device
136 Fluid inlet device
138 Fluid outlet device
140 First measuring unit
142 Second measuring unit
144 Third measuring unit
146 Fourth measuring unit

152 Oven chamber
154 Chain tension control
156 Roller
158 Air duct
160 Openings
162 Fluid flow
200 Method for preventing faults of an oven for the production of containers
210 Conveying the containers along a drying section
220 Ascertain an inlet number and an outlet number of containers
230 Determining an amount of container loss

The invention claimed is:

1. A device for preventing faults of an oven for the production of containers comprising:
a conveyor unit with transport pins, the conveyor unit being designed for conveying the containers along a drying section;
at least one measuring unit configured to ascertain an inlet number of containers entering an observation section of the drying section and an outlet number of containers exiting the observation section; and
a control device configured to determine an amount of container loss on the basis of a deviation between the inlet number and the outlet number.

2. A device according to claim 1, wherein the measuring unit is further designed to ascertain at least one actual control variable for controlling the observation section, wherein the actual control variable is a conveying speed of the conveyor unit, a transport density along the observation section, a torque of a drive unit driving the conveyor unit, a fluid flow control variable for controlling at least one fluid flow device for supplying the containers with a fluid flow along the observation section, a temperature of the fluid flow, a target temperature of the containers, a heating temperature of the observation section, a heating temperature profile along the observation section, and/or a heating power of a heating device of the oven,
wherein the transport density characterizes a conveyed number of containers per unit of time.

3. A device according to claim 2, wherein the control device is further designed to output an adjustment command for adjusting at least one target control variable for controlling the conveyor unit and/or the oven on the basis of at least one of the inlet number, the outlet number, the amount of container loss, and the at least one actual control variable, wherein the target control variable is the conveying speed of the conveyor unit, the transport density along the observation section, the torque of the drive unit driving the conveyor unit, the fluid flow control variable for controlling the at least one fluid flow device for supplying the containers with the fluid flow along the observation section, the temperature of the fluid flow, the target temperature of the containers, the heating temperature of the observation section, the heating temperature profile along the observation section, and/or the heating power of the heating device of the oven.

4. A device according to claim 1, wherein the measuring unit is further designed to ascertain at least one actual control variable and/or at least one target control variable,
wherein the actual control variable and/or the target control variable is for controlling the conveyor unit and characterizes a conveying speed of the conveyor unit and/or a transport density along the observation section, wherein the transport density characterizes a conveyed number of containers per unit of time, and/or
wherein the actual control variable and/or the target control variable is for controlling the oven and is a fluid flow control variable for controlling at least one fluid flow device for supplying the containers with a fluid flow along the observation section of a heating device of the oven, a temperature of the fluid of the fluid flow, a target temperature of the containers, a heating temperature, and/or a heating temperature profile at least along the observation section.

5. A device according to claim 3,
wherein the at least one measuring unit is further designed to ascertain at least one container property, wherein the container property is one of a container type, a container body and a container geometry of the containers, and
wherein the control device is further configured to output an adjustment command for adjusting the at least one target control variable for controlling the conveyor unit and/or the oven,
wherein the adjustment command is still based on the container property.

6. A device according to claim 3,
wherein the control device is further designed to determine an adjustment command for adjusting the at least one target control variable for controlling the conveyor unit and/or the oven such that the amount of container loss is minimized.

7. A device according to claim 6,
wherein the adjustment command is still based on a first priority level, and
wherein the first priority level comprises predetermined legally prescribed upper and/or lower limits of the actual control variable and/or the target control variable, and the adjustment command adjusts the target control variable in such a way that the target control variable reaches at most the upper and/or lower limit.

8. A device according to claim 7,
wherein the adjustment command is based on a second priority level, which is subordinate to the first priority level, and
wherein the second priority level characterizes at least one of:
minimized energy consumption of the conveyor unit, the observation section, the at least one heating device, the at least one fluid flow device, and/or the oven required for producing the containers, and
minimized amount of container loss.

9. A device according to claim 6,
wherein the control device is further designed to determine the adjustment command on the basis of a contact pressure of the containers for stabilizing the containers on the conveyor unit, the contact pressure being based on at least one of a container property, the conveying speed, a container density, and the fluid flow applied to the containers, in particular along the observation section, and
wherein the contact pressure is a minimum contact pressure which stabilizes the containers on the conveyor unit.

10. A device according to claim 8,
wherein the control device is further designed to output control information, and
wherein the control information characterizes at least one of the inlet number, the outlet number, the amount of container loss, the at least one actual control variable, the at least one target control variable, the adjustment command, the observation section, the container property, a first priority level, the second priority level, and the minimum contact pressure for stabilizing the containers on the conveyor unit.

11. A device according to claim 1, further comprising a display unit designed to display the control information.

12. A device according to claim 8, further comprising a display unit designed to display the control information, wherein the display unit is designed to receive an input, and/or wherein the device further comprises an input unit which is designed to receive the input, wherein the input comprises at least one of the at least one actual control variable, the at least one target control variable, the adjustment command, the observation section, the container property, the first priority level, the second priority level, and the minimum contact pressure for stabilizing the containers on the conveyor unit, and wherein the control device is designed to receive the input and, on the basis of the input, to determine the at least one actual control variable, the at least one target control variable, the observation section, the container property, the first priority level, the second priority level, and/or the contact pressure, and/or to output the adjustment command on the basis of the input.

13. A device according to claim 1, wherein the drying section comprises two or more observation sections, wherein the at least one measuring unit is designed, with respect to at least one of the two or more observation sections, to ascertain an inlet number of containers entering the at least one observation section and an outlet number of containers exiting the at least one observation section, and wherein the control device is designed to determine an amount of container loss of the at least one observation section on the basis of a deviation between the inlet number and the outlet number of the at least one observation section.

14. A device according to claim 2, wherein the drying section comprises two or more observation sections, wherein the at least one measuring unit is designed, with respect to at least one of the two or more observation sections, to ascertain an inlet number of containers entering the at least one observation section and an outlet number of containers exiting the at least one observation section, and wherein the control device is designed to determine an amount of container loss of the at least one observation section on the basis of a deviation between the inlet number and the outlet number of the at least one observation section, wherein the at least one measuring unit is designed in relation to the at least one of the two or more observation sections to ascertain at least one actual control variable for controlling the conveyor unit and/or the oven, in particular the at least one observation section.

15. A device according to claim 3, wherein the drying section comprises two or more observation sections, wherein the at least one measuring unit is designed, with respect to at least one of the two or more observation sections, to ascertain an inlet number of containers entering the at least one observation section and an outlet number of containers exiting the at least one observation section, and wherein the control device is designed to determine an amount of container loss of the at least one observation section on the basis of a deviation between the inlet number and the outlet number of the at least one observation section, wherein the control device is further designed with respect to the at least one or and/or a further one of the two or more observation sections for outputting at least one adjustment command for adjusting at least one target control variable for controlling the conveyor unit and/or the oven, in particular for controlling the at least one observation section, on the basis of at least one of at least one of the amount of container loss and the at least one actual control variable of the at least one observation section.

\* \* \* \* \*